United States Patent [19]

Hirota et al.

[11] Patent Number: 5,114,455
[45] Date of Patent: May 19, 1992

[54] MOLD FOR PRODUCING LENS, USING MOLD RECESSES TO AID IN LENS RELEASE

[75] Inventors: Shinichiro Hirota, Hachioji; Kishio Sugawara, Hamura; Kenji Okamura, Akigawa, all of Japan

[73] Assignee: Hoya Corporation, Tokyo, Japan

[21] Appl. No.: 642,392

[22] Filed: Jan. 17, 1991

[30] Foreign Application Priority Data

Jan. 24, 1990 [JP] Japan .................................. 2-14282

[51] Int. Cl.$^5$ ............................................. C03B 11/08
[52] U.S. Cl. .................................... 65/275; 425/808; 264/2.2; 264/2.3
[58] Field of Search ........................ 65/66, 64, 102, 106, 65/275, 323, 305; 264/1.1, 2.2, 2.3, 1.2; 425/808, 422

[56] References Cited

U.S. PATENT DOCUMENTS 4,847,020  7/1989  Akhavi ...................... 264/2.2
4,955,580  9/1990  Seden ........................ 264/2.2

FOREIGN PATENT DOCUMENTS 0320887  6/1989  European Pat. Off. .......... 65/275

Primary Examiner—Richard V. Fisher
Assistant Examiner—John M. Hoffmann
Attorney, Agent, or Firm—Nixon & Vanderhye

[57] ABSTRACT

A mold for use in producing a lens comprises a pair of first and second mold portions which are arranged in opposed relation to each other. At least one of the first and second mold portions is movable toward and away from the other. Molding surfaces of the respective first and second mold portions have their respective areas which are located radially outwardly of an effective aperture of the lens. A plurality of recesses are formed in the molding surface of at least one of the first and second mold portions and are located in the area of the molding surface of the at least one mold portion. These recesses separate the lens from the molds.

19 Claims, 6 Drawing Sheets

MOLD FOR PRODUCING LENS, USING MOLD RECESSES TO AID IN LENS RELEASE

BACKGROUND OF THE INVENTION

The present invention relates to a mold for use in producing a lens and, more particularly, to a mold suitable in producing a lens having a concave surface.

Conventionally, a method of molding a lens is known which is arranged as follows. Specifically, a glass material and a mold are heated to temperature at which the glass material is softened, that is, to temperature corresponding to glass viscosity of $10^{7.5}$ to $10^{11}$ poises. The glass material is press-molded by the use of a pair of upper and lower or first and second mold portions of the mold, to form a lens. Subsequently, the lens is cooled to temperature in the vicinity of glass transition temperature that is $10^{13}$ poises, or to a temperature lower than the glass transition temperature. Then, the pair of first and second mold portions are released from the lens or are moved away from each other, and the lens is taken out or removed from the pair of first and second mold portions.

As shown in FIG. 11 of the attached drawings, in the case where a lens 3 having its both convex surfaces is molded on the basis of the above-described molding method, a shrinkage difference between the lens 3 and a pair of upper and lower or first and second mold portions 1 and 2 of a mold 7 causes gaps 4 to occur between the lens 3 and the first mold portion 1 and between the lens 3 and the second mold portion 2, at the cooling step from the press molding temperature to the mold-release temperature. Accordingly, air enters locations between the mold portions 1 and 2 and the lens 3 through the gaps 4, so that it is possible to easily release the lens 3 from the mold portions 1 and 2. Generally, the mold 7 has its coefficient of thermal expansion which is less than that of the lens 3.

In the case where a lens having its one or both concave surfaces, however, the following disadvantage or problem occurs. That is, as shown in FIG. 12, the shrinkage difference between the glass material of the lens 3 and the mold 7 at cooling causes a closed gap space 5 to occur between the mold portion 1 and the lens 3. Because the gap space 5 is negative in pressure, the lens 3 tends to adhere to the mold portion 1. Thus, it is difficult to release the lens 3 from the mold 7. In this case, if a physical force is applied to the lens 3 to release the same from the mold 7, a surface accuracy of the lens 3 is damaged.

SUMMARY OF THE INVENTION

It is therefore an object of the invention to provide a mold for use in producing a lens, which is easy in release of the lens from at least one of a pair of mold portions of the mold.

According to the invention, there is provided a mold for use in producing a lens having an effective aperture, comprising:

a pair of first and second mold portions arranged in opposed relation to each other, at least one of the first and second mold portions being movable toward and away from the other, the first and second mold portions having their respective molding surfaces, each of the molding surfaces having an area located radially outwardly of the effective aperture of the lens; and a plurality of recesses formed in the molding surface of at least one of the first and second mold portions, the recesses being located in the area of the molding surface of the at least one mold portion.

Preferably, the molding surface of the first mold portion is a convexly curved surface, and each of the recesses has its depth which is 5 $\mu$m to 0.2 mm.

With the arrangement of the invention, the following advantages are produced. That is, the plurality of recesses are formed in the molding surface of the first mold portion in the area thereof which is located radially outwardly of the effective aperture of the lens. Accordingly, a plurality of projections are formed on the lens by the recesses in the molding surface of the first mold portion. At shrinkage of the lens, the projections ride respectively on radially inner edges of the respective recesses. Thus, gaps are defined between the first mold portion and the lens at respective locations between the recesses. Air enters, through the gaps, radially inwardly of the molding surface of the first mold portion or radially inwardly of the lens toward a center thereof. This enables the first mold portion to be easily released from the lens. Further, a surface accuracy of the lens is not damaged.

BRIEF DESCRIPTION OF THE DRAWINGS

FIG. 5b is a fragmentary enlarged cross-sectional view of a lens which is formed by the use of the first mold portion illustrated in FIG. 5a;

FIG. 9b is a fragmentary enlarged cross-sectional view taken along the line IXb—IXb in FIG. 9a;

DESCRIPTION OF THE EMBODIMENTS

Referring first to FIGS. 1 through 4, there is shown a mold 50 for use in producing a lens 13, according to a first embodiment of the invention.

Figure 3:
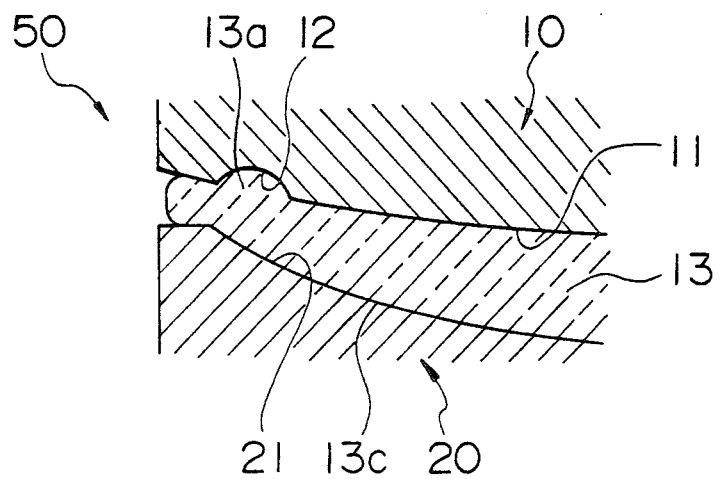
FIG. 3 is a fragmentary enlarged cross-sectional view showing a condition of the lens and the first and second mold portions illustrated in FIGS. 1 and 2 immediately after press molding.
Figure 4:
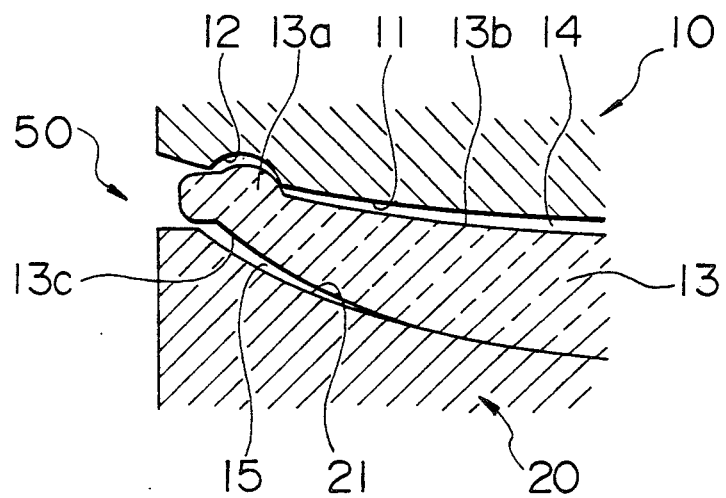
FIG. 4 is a fragmentary enlarged cross-sectional view showing a condition of the lens and the first and second mold portions illustrated in FIG. 3 after shrinkage of the lens.

The mold 50 comprises a pair of upper and lower or first and second mold portions 10 and 20 which are arranged in opposed relation to each other. The second mold portion 20 is illustrated in FIGS. 3 and 4. At least one of the first and second mold portions 10 and 20 is movable toward and away from the other to form the lens 13 which has one concave surface 13b and the other convex surface 13c. The first and second mold portions 10 and 20 have their respective molding surfaces 11 and 21.

The molding surface 11 of the first mold portion 10 has an annular area A which is located radially outwardly of an effective aperture r of the lens 13. The first mold portion 10 is provided for forming the concave surface 13b of the lens 13. Accordingly, the molding surface 11 of the first mold portion 10 is formed into a convex surface configuration. The first mold porition 10 has its diameter R which is larger than the effective aperture r of the lens 13. For example, the diameter R of the first mold portion 10 is 28 mm, while the effective aperture r of the lens 13 is 23 mm.

Figure 1:
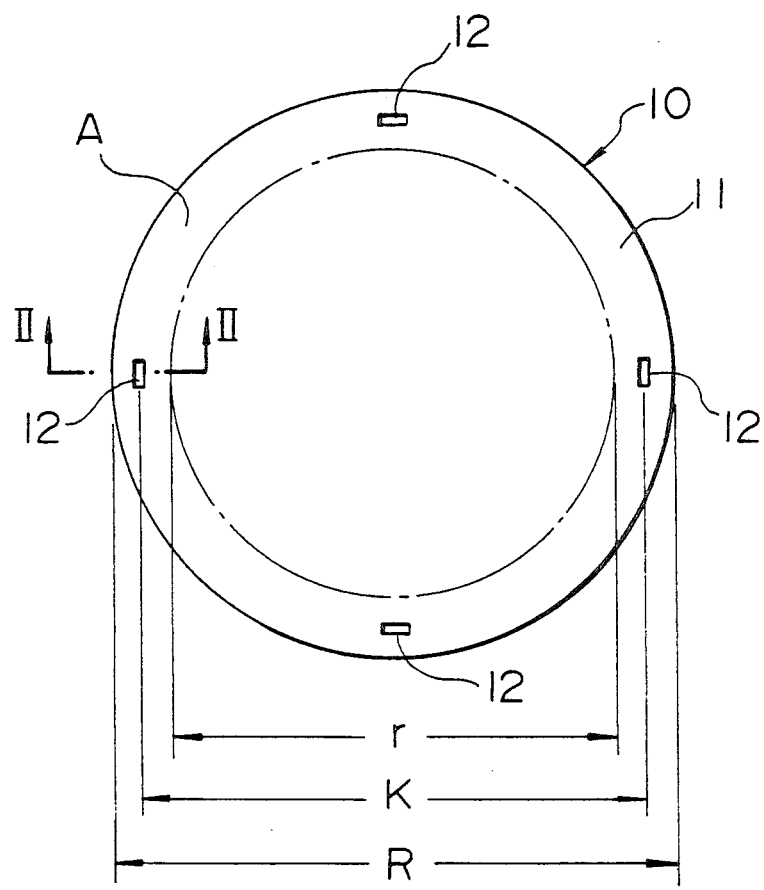
FIG. 1 is a top plan view of a molding surface of a first one of a pair of first and second mold portions which cooperate with each other to form a mold for use in producing a lens, according to a first embodiment of the invention, the molding surface of the first mold portion being provided therein with a plurality of recesses.
Figure 2:
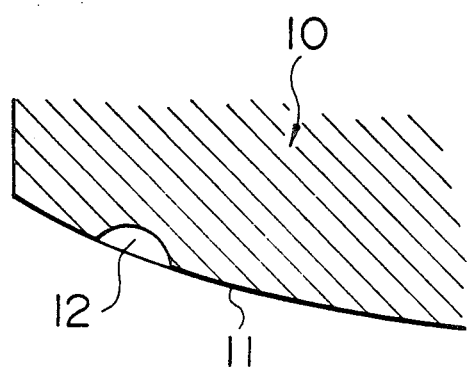
FIG. 2 is a fragmentary enlarged cross-sectional view of the first mold portion, taken along the line II—II in FIG. 1, showing one of the recesses.

A plurality of, four in FIG. 1, recesses 12 are formed in the molding surface 11 of the first mold portion 10. The recesses 12 are located in the annular area A of the molding surface 11 of the first mold portion 10. The recesses 12 are discontinuous to each other peripherally of the molding surface 11 of the first mold portion 10. That is, the recesses 12 are arranged on a circle having a diameter K on the molding surface 11 of the first mold portion 10 in equidistantly spaced relation to each other. For example, the diameter K is 26 mm. In the first embodiment, each of the recesses 12 is elongated peripherally of the molding surface 11 of the first mold portion 10. The recess 12 has its cross-sectional configuration which is substantially semi-circular as shown in FIG. 2. The recess 12 can suitably decided in dimension. In the first embodiment, for example, the recess 12 has a width which is about 100 μm, a length which is about 300 μm, and a depth which is about 30 μm. Generally, however, it is desirable that the depth of the recess 12 is 5 μm to 0.2 mm. It is preferable that a radially inward edge of the recess 12 is formed such that the recess 12 is smoothly connected to the molding surface 11.

As shown in FIGS. 3 and 4, a glass material of the lens 13 enters the recesses 12 (only one shown) at molding of the lens 13, so that a plurality of projections 13a are formed on the lens 13 by the recesses 12 in the molding surface 11 of the first mold portion 10. At shrinkage of the lens 13, each of the projections 13a rides on a radially inward edge of a corresponding one of the recesses 12, by a shrinkage difference between the lens 13 and the mold 50. Thus, a gap 14 is defined between the molding surface 11 of the first mold portion 10 and one of both surfaces of the lens 13 at locations between the recesses 12 and 12 arranged on a circle. Air enters, through the gap 14, radially inwardly of the molding surface 11 of the first mold portion 10 or radially inwardly of the lens 13 toward a center thereof. A gap 15 is also formed between the molding surface 21 of the second mold portion 20 and the other surface of the lens 13. The gaps 14 and 15 enable the first and second mold portions 10 and 20 to be easily released from the lens 13.

A molding example of the lens 13 due to the pair of first and second mold portions 10 and 20 will next be described. In the molding example, used as the first mold portion 10 is a mold portion in which a sintered tungsten carbide (WC; Co) is treated or processed by HIP (hot isostatic press), and the molding surface 11 is processed to a mirror surface. The mold 50 has a coefficient of thermal expansion which is $50 \times 10^{-7}/°$ C. The dimension or size of each of the first mold portion 10 and the recesses 12 was as exemplified above. SF 11 of a heavy flint optical glass was used as a glass material of the lens 3 to be molded. The optical glass had a transition point Tg which was 435° C., a yield point Ts which was 470° C., and a coefficient of thermal expansion which was $93 \times 10^{-7}/°$C. within a range of 100° C. to 300° C.

The glass material of the lens 13 to be molded was set between the first and second mold portions 10 and 20 which were located within the nitrogen atmosphere. The first and second mold portions 10 and 20 and the glass material were heated and were isothermalized, to soften the glass material. Subsequently, the glass material was pressed at temperature of 507° C. corresponding to $10^{8.5}$ poises of the glass viscosity, under pressure of 100 kg/cm² for sixty (60) seconds. The condition of the first and second mold portions 10 and 20 and the lens 13 at this time are illustrated in FIG. 3. In this case, the first mold portion 10 and the lens 13 are in intimate or close contact with each other, and the lens 13 enters also the interiors of the respective recesses 12.

Subsequently, the press force was reduced, the lens 13 was cooled to 300° C. together with the mold 50. In this case, the glass is brought to a solidified condition at about 456° C. which corresponds to $10^{11}$ poises. At cooling, the glass and the mold 50 shrink. Since, however, the coefficient of thermal expansion of the glass is higher than that of the mold 50, the radius curvature of the glass is brought to one smaller than that of each of the first and second mold portions 10 and 20. Thus, the gaps 14 and 15 occur between the lens 13 and the first and second mold portions 10 and 20, as illustrated in FIG. 4. Further, since the lens 13 shrinks radially inwardly by about 8.7 μm, each glass projection 13a, which is located within a corresponding one of the recesses 12, rides on the radially inward edge of the recess 12. Thus, a gap is formed between the molding surface 11 of the first mold portion 10 and the lens 13 at a location between the adjacent recesses 12 and 12 arranged on a circle. Accordingly, since air enters the gap 14 through the gap between the adjacent recesses 12 and 12, the lens 13 can easily be released from the mold 50.

After releasing of the mold 50, the taken-out lens 13 was annealed or cooled gradually, and the configuration accuracy of the lens 13 was inspected or investigated. The inspection indicated that a power was within two Newton's fringes and astigmatical irregularity was within ½ fringe and, thus, there was produced a superior lens. In this connection, the lens 13 may be centered to 25 mm in diameter at post processing, whereby the projections 13a are removed. Further, since the projections 13a are located on the outside of the effective aperture of 23 mm of the lens 13, the latter may be used as it is without removal of the projections 13a.

The configuration, dimension, number, arrangement and construction of the recesses 12 can be modified in accordance with the use of the lens.

Figure 5A:
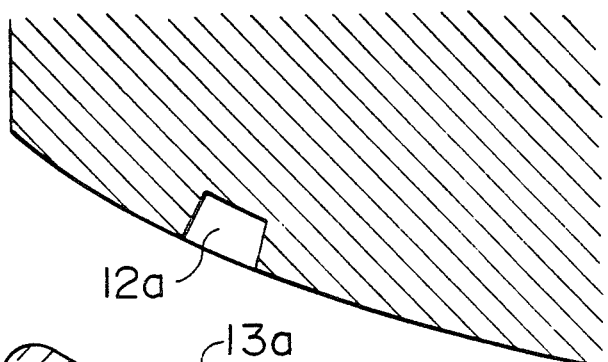
FIG. 5a is a fragmentary enlarged cross-sectional view of a first modification of the first embodiment illustrated in FIGS. 1 through 4, showing one of a plurality of recesses formed in the molding surface of the first mold portion.
Figure 5B:
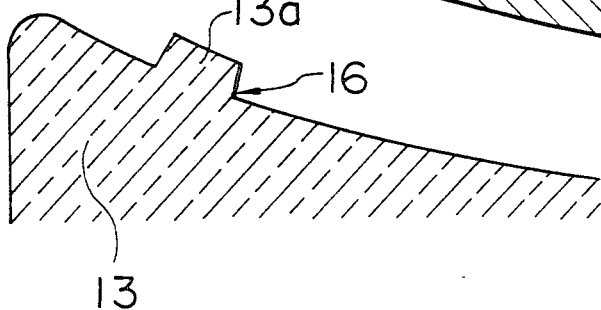

FIG. 5a shows a first modification of the first embodiment illustrated in FIGS. 1 through 4, in which the cross-sectional configuration of each of the recesses 12 is modified. That is, a sharp recess 12a illustrated in FIG. 5a has a cross-sectional configuration which is substantially rectangular. In this case, in order to avoid that resistance becomes large at shrinkage, each of the recesses 12a has its depth which is equal to or less than 50 μm. If the resistance at shrinkage is excessively large, cracks tend to occur at a portion, indicated by the arrow 16, of the projection 13a on the lens 13, and a bad influence will be exerted upon the surface accuracy of the lens 13.

Figure 6:
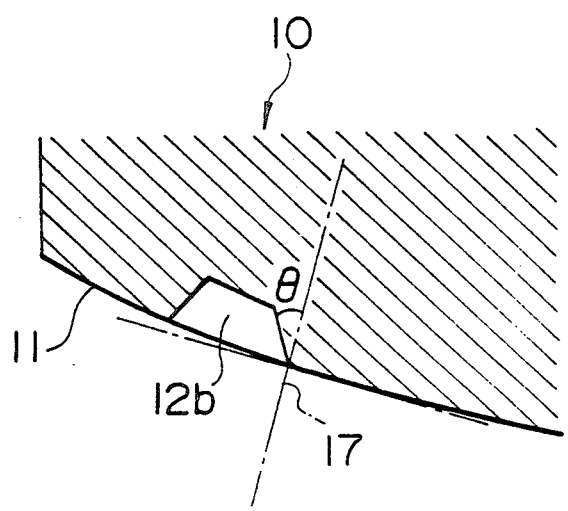
FIG. 6 is a fragmentary enlarged cross-sectional view of a second modification of the first embodiment illustrated in FIGS. 1 through 4, showing one of a plurality of recesses formed in the molding surface of the first mold portion.

FIG. 6 shows a second modification of the first embodiment illustrated in FIGS. 1 through 4. In the second modification, the molding surface 11 of the first mold portion 10 is curved or bent. Each of a plurality of recesses 12b has a side surface which is located adjacent a center side of the molding surface 11 of the first mold portion 10. The side surface of the recess 12b is inclined, with an angle θ, with respect to a normal line 17 to the curved molding surface 11 of the first mold portion 10. It is desirable that the side surface of the recess 12b is inclined with respect to the normal line 17 with the angle θ equal to or above 5°.

Figure 7:
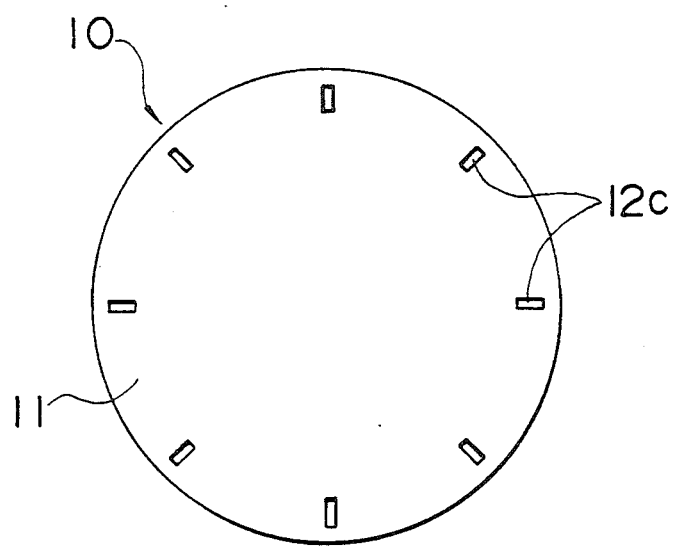
FIG. 7 is a top plan view of the molding surface of the first mold portion, showing a third modification of the first embodiment illustrated in FIGS. 1 through 4, showing one of a plurality of recesses formed in the molding surface of the first mold portion.

FIG. 7 shows a third modification of the first embodiment illustrated in FIGS. 1 through 4. In the third modification, eight recesses 12c are arranged peripherally of the molding surface of the mold portion in equidistantly spaced relation to each other. Each of the recesses 12c is elongated radially of the molding surface 11 of the first mold portion 10.

Figure 8:
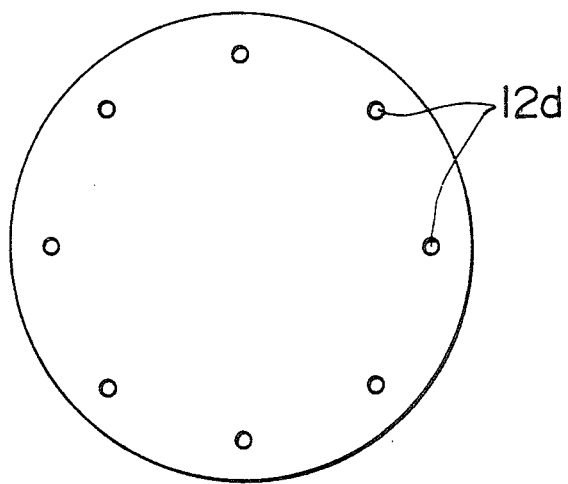
FIG. 8 is a view similar to FIG. 7, but showing a fourth modification of the first embodiment illustrated in FIGS. 1 through 4, showing one of a plurality of recesses formed in the molding surface of the first mold portion.

FIG. 8 shows a fourth modification of the first embodiment illustrated in FIGS. 1 through 4. In the fourth modification, each of a plurality of recesses 12d has its bottom surface which is spherical.

Figure 9A:
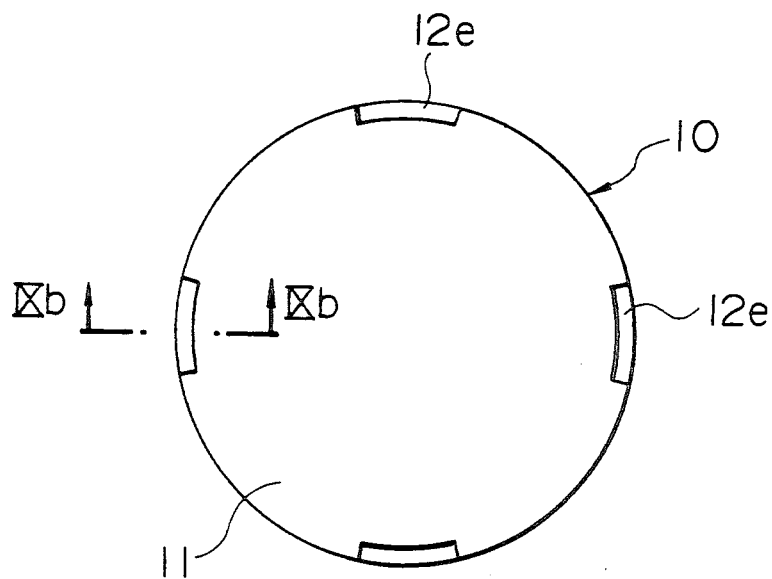
FIG. 9a is a view similar to FIG. 7, but showing a fifth modification of the first embodiment illustrated in FIGS. 1 through 4, showing one of a plurality of recesses formed in the molding surface of the first mold portion.
Figure 9B:
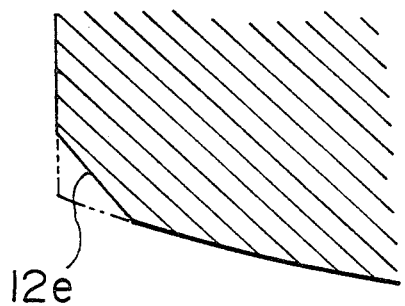

FIGS. 9a and 9b show a fifth modification of the first embodiment illustrated in FIGS. 1 through 4. In the fifth modification, each of a plurality of recesses is formed by a chamfer 12e which is formed at a peripheral edge of the molding surface 11 of the first mold portion 10. The chamfer 12e is elongated peripherally of the molding surface 11 of the first mold portion 10. The configuration of the peripheral edge of the first mold portion 10, before the recesses 12e are formed in the molding surface 11 thereof, is illustrated in FIG. 9b by the two-dot-and-dash lines.

Figure 10:
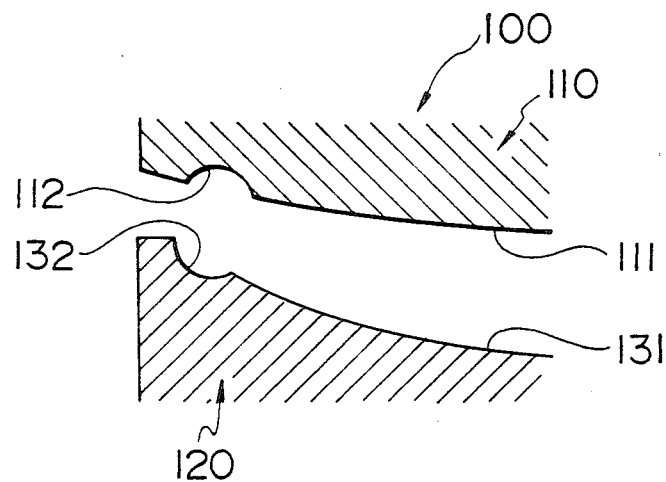
FIG. 10 is a fragmentary enlarged cross-sectional view of a pair of first and second mold portions of a mold according to a second embodiment of the invention, the mold portions having their respective molding surfaces each of which is formed therein with a plurality of recesses.
Figure 11:
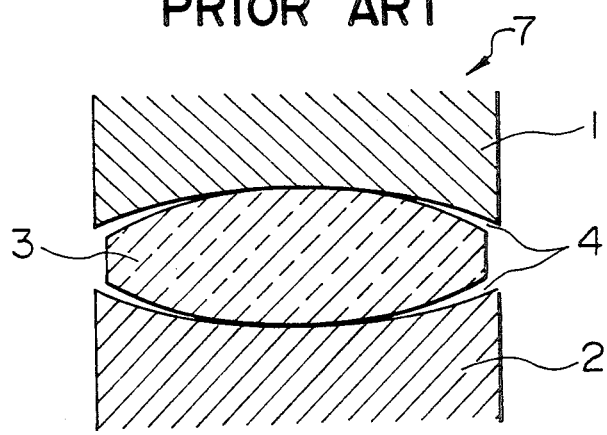
FIG. 11 is an enlarged longitudinal cross-sectional view of a condition in which a convex lens is molded by the use of a pair of conventional first and second mold portions.
Figure 12:
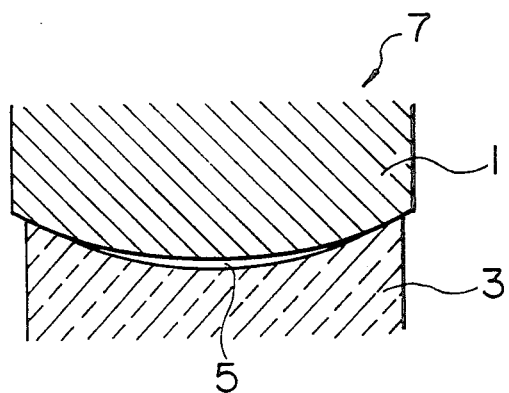
FIG. 12 is an enlarged longitudinal cross-sectional view of a condition in which a concave lens is molded by the use of a pair of conventional first and second mold portions, with the second mold portion omitted from illustration.

Referring next to FIG. 10, there is shown a mold for use in producing a lens, according to a second embodiment of the invention. In FIG. 10, components and parts similar to those illustrated in FIGS. 1 through 4 are designated by the like or same reference numerals, and the description of the like or similar components and parts will therefore be omitted to avoid repetition.

As shown in FIG. 10, a mold 100 comprises a pair of upper and lower or first and second mold portions 110 and 120 which are movable toward and away from each other. A plurality of first recesses 112 are formed in a molding surface 111 of the first mold portion 110, in a manner similar to that of the first embodiment illustrated in FIGS. 1 through 4. In addition to the first recesses 112, a plurality of second recesses 132 are formed in a molding surface 131 of the second mold portion 120. The molding surface 131 of the second mold portion 120 has an annular area which is located radially outwardly of an effective aperture of a lens to be molded. The second recesses 132 are located in the annular area of the molding surface 131 of the second mold portion 120.

By the recesses 132, it is further ensured that a gap is formed between the molding surface 131 of the second mold portion 120 and a surface of the lens to be molded.

In the above-described first and second embodiments of the invention, it is desirable that the material of each of the first and second mold portions 10 and 20 or 110 and 120 is one whose coefficient of thermal expansion is 30 through $95 \times 10^{-7}/°C$. Other than the above-mentioned tungsten carbide, there can be used SiC whose coefficient of thermal expansion is $40 \times 10^{-7}/°C$., $Si_3N_4$ whose coefficient of thermal expansion is $35 \times 10^{-7}/°C$, $ZrO_2$ whose coefficient of thermal expansion is $92 \times 10^{-7}/°C$., $Al_2O_3$ whose coefficient of thermal expansion is $78 \times 10^{-7}/°C$., various kinds of cermets whose coefficient of thermal expansion is 80 through $90 \times 10^{-7}/°C$., or the like, for example. Further, as the glass material of the lens to be molded, various kinds of optical glass materials can be used whose coefficient of thermal expansion is 60 through $150 \times 10^{-7}/°C$.

The first and second embodiments of the invention have been described previously. The invention should not be limited to the first and second embodiments, but various variations or modifications may be made to the invention. For instance, the recesses may be made only in the molding surface of the second mold portion. Further, in the first and second embodiments, the recesses are formed in the first mold portion or in the first and second mold portions which are used in formation of a lens having a concave surface. However, a plurality of recesses may be formed in one or both molding surfaces of mold portions which are used in formation of a planar lens or in a lens having both convex surfaces and having a large radius of curvature. In this case, advantages can be produced in release of the mold portions from the lens. Furthermore, the invention is not limited to a mold for molding a glass lens, but may be applied also to a mold for molding a plastic lens.

What is claimed is:

1. A mold for use in producing a lens having an effective aperture, comprising:
    a pair of first and second mold portions arranged in opposed relation to each other, at least one of said first and second mold portions being movable toward and away from the other, said first and second mold portions having respective molding surfaces, said molding surfaces having respective areas located radially outwardly of the effective aperture of the lens during molding thereof; and means including a plurality of recesses formed in said molding surface area of at least one of said first and second mold portions for forming, during molding, a plurality of projections on the lens outwardly of its effective aperture whereby shrinkage of the lens during molding causes the projections to ride up respectively in said recesses to establish a gap between the lens and the molding surface of said one mold portion, thereby allowing for easy lens removal from said at least one mold portion.

2. The mold according to claim 1, wherein each of said recesses is a chamfer formed at a peripheral edge of said molding surface of said at least one mold portion.

3. The mold according to claim 2, wherein the chamfer is elongated peripherally of said molding surface of said at least one mold portion.

4. The mold according to claim 1, wherein each of said recesses has a depth which is 5 μm to 0.2 mm.

5. The mold according to claim 1, wherein said recesses are circumferentially spaced one from the other about a circle on said molding surface of said at least one mold portion, said circle having a diameter which is larger than the effective aperture of the lens and smaller than an outer diameter of said molding surface of said at least one mold portion.

6. The mold according to claim 1, wherein each of said recesses is forms a discrete recess elongated peripherally of said molding surface of said at least one mold portion.

7. The mold according to claim 1, wherein each of said recesses has a cross-sectional configuration which is substantially semi-circular.

8. The mold according to claim 1, wherein each of said recesses has a cross-sectional configuration which is substantially rectangular.

9. The mold according to claim 1, wherein each of said recesses has a side surface which is located adjacent to a center side of said molding surface of said at least one mold portion, the side surface being inclined with respect to a line normal to said molding surface of said at least one mold portion adjacent an intersection of the side surface and said mold surface with an angle at least equal to 5°.

10. The mold according to claim 1, wherein each of said recesses is elongated radially of said molding surface of said at least one mold portion.

11. The mold according to claim 1, wherein each of said recesses has a bottom surface which is spherical.

12. The mold according to claim 1, wherein said recesses are formed in both the molding surfaces of the respective first and second mold portions.

13. The mold according to claim 12, wherein the recesses formed in said molding surface of said first mold portion and the recesses formed in said molding surface of said second mold portion are identical in configuration with each other.

14. The mold according to claim 12, wherein the recesses formed in said molding surface of said first mold portion and the recesses formed in said molding surface of said second mold portion are different in configuration from each other.

15. A mold for use in producing a lens having an effective aperture, comprising:

a pair of first and second mold portions arranged in opposed relation to each other, at least one of said first and second mold portions being movable toward and away from the other, said first and second mold portions having respective molding surfaces, said molding surfaces each having a respective area located radially outwardly of the effective aperture of the lens;

a plurality of recesses formed in the molding surface area of at least one of said first and second mold portions; and said recesses being discontinuous to each other peripherally of said molding surface area of said at least one mold portion.

16. The mold according to claim 15, wherein said recesses are arranged in equidistantly spaced relation to each other peripherally of said molding surface of said at least one mold portion.

17. A mold for producing a concave lens, comprising:

first and second molding surfaces for molding lens material disposed between said molding surfaces;

at least one of said first and second molding surfaces being movable toward and away from the other of said first and second molding surfaces;

at least one of said first and second molding surfaces having means including circumferentially spaced recesses formed therein for receiving the lens material for forming projections, during molding, on the lens material between said molding surfaces whereby shrinkage of the lens during molding causes the projections to move out of said recesses to facilitate removal of the lens from between said first and second molding surfaces.

18. A mold according to claim 17 wherein said recesses are discontinuous to each other peripherally of said at least one molding surface.

19. A mold according to claim 17 wherein said recesses are equidistantly spaced relative to one another.

* * * * *